United States Patent
Davis et al.

(10) Patent No.: US 8,327,738 B2
(45) Date of Patent: Dec. 11, 2012

(54) COMPOSITE TRANSMISSION HOUSING WITH DISCONTINUOUS FIBER PREFORMS

(75) Inventors: Geoffrey Clive Robert Davis, Madison, CT (US); Thomas Arthur Carstensen, Shelton, CT (US); Stephen Carter Varanay, Guilford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1691 days.

(21) Appl. No.: 10/703,372

(22) Filed: Nov. 7, 2003

(65) Prior Publication Data

US 2005/0097984 A1     May 12, 2005

(51) Int. Cl.
*F16H 57/02* (2006.01)
*F16H 57/04* (2010.01)
*F16H 61/00* (2006.01)

(52) U.S. Cl. ............ 74/606 R; 343/872; 29/889.6; 416/169 R; 416/107; 264/258; 89/36.02; 244/17.11

(58) Field of Classification Search ............... 74/606 R; 244/17.11; 89/36.02; 416/107, 224, 169 R; 264/258; 29/889.6; 343/872; 156/178, 222; 428/116, 301.1, 36.3; 442/148, 366; 411/436; 524/598; 220/62.19
See application file for complete search history.

(56) References Cited

U.S. PATENT DOCUMENTS

| | | | | |
|---|---|---|---|---|
| 2,477,375 | A | * | 7/1949 | Jablonsky ................. 156/222 |
| 3,115,271 | A | * | 12/1963 | Anderson et al. ............ 343/872 |
| 3,762,835 | A | * | 10/1973 | Carlson et al. ................ 416/224 |
| 3,851,786 | A | * | 12/1974 | Kaempen .................... 220/62.19 |
| 3,942,502 | A | * | 3/1976 | Gorres et al. ............. 123/195 R |
| 3,991,248 | A | * | 11/1976 | Bauer ............................ 442/148 |
| 4,226,200 | A | * | 10/1980 | Morisawa et al. ........... 74/606 R |
| 4,467,754 | A | * | 8/1984 | Hayashi et al. ............ 123/195 H |
| 4,469,730 | A | * | 9/1984 | Burhans ........................ 428/36.3 |
| 4,532,292 | A | * | 7/1985 | Dorries et al. ................. 524/598 |
| 4,868,962 | A | * | 9/1989 | McArdle et al. .............. 29/889.6 |
| 4,942,013 | A | | 7/1990 | Palmer et al. |
| 4,954,382 | A | * | 9/1990 | Riefler et al. .................. 428/116 |
| 4,995,971 | A | * | 2/1991 | Droste et al. ............. 210/167.03 |
| 5,080,547 | A | * | 1/1992 | Moghe ........................... 411/436 |
| 5,091,242 | A | * | 2/1992 | Chung ......................... 428/301.1 |

(Continued)

FOREIGN PATENT DOCUMENTS

FR     2 777 629     * 10/1999

OTHER PUBLICATIONS

Fiber/Matrix Composites, David J. Fowler, www.me.utexas.edu/~melingo/art/new/fibre.html, unknown date.*

(Continued)

*Primary Examiner* — Vinh T. Luong
(74) *Attorney, Agent, or Firm* — Carlson, Gaskey and Olds PC

(57) ABSTRACT

A composite transmission housing includes resin transfer molding or vacuum assisted resin transfer molding manufacturing processes combined with discontinuous fiber preforms. The preforms are assembled in a prepared injection and cure mold with additional details and fillers. The preforms are constructed such that the preforms are assembled into the mold in a specific order to assure proper arrangement. Using a combination of vacuum and pressure, a resin is injected into the mold to completely infuse the assembled preforms. At completion, the mold is heated to the resin cure temperature and held at this temperature for sufficient time to insure complete cure.

13 Claims, 17 Drawing Sheets

U.S. PATENT DOCUMENTS

| | | | |
|---|---|---|---|
| 5,657,672 A * | 8/1997 | Mochizuki et al. | 74/606 R |
| 5,855,471 A * | 1/1999 | Chory | 416/169 R |
| 5,900,311 A | 5/1999 | Campanella et al. | |
| 5,904,972 A | 5/1999 | Tunis, III et al. | |
| 5,939,007 A * | 8/1999 | Iszczyszyn et al. | 264/258 |
| 5,939,013 A | 8/1999 | Han et al. | |
| 6,030,563 A | 2/2000 | Strasser et al. | |
| 6,050,778 A * | 4/2000 | McArdle et al. | 416/107 |
| 6,090,335 A | 7/2000 | McClure et al. | |
| 6,096,669 A * | 8/2000 | Colegrove et al. | 442/366 |
| 6,134,881 A | 10/2000 | Strasser et al. | |
| 6,276,254 B1 * | 8/2001 | Cordova et al. | 89/36.02 |
| 6,302,356 B1 * | 10/2001 | Hawkins | 244/17.11 |
| 6,729,206 B2 * | 5/2004 | Hayabuchi et al. | 74/606 R |
| 7,934,580 B2 * | 5/2011 | Van de Flier et al. | 181/246 |
| 7,942,237 B2 * | 5/2011 | van de Flier et al. | 181/256 |
| 2002/0117252 A1 * | 8/2002 | Baldwin | 156/178 |
| 2006/0070490 A1 * | 4/2006 | Richardson | 74/606 R |

OTHER PUBLICATIONS

Composite gear housing, http://en.wikipedia.org/wiki/Composite_gear_housing, Mar. 25, 2008.*

PTO 09-5597 Translation of FR 2777629 (Galleron et al.), May 2009, pp. 1-7.*

\* cited by examiner

| PROCESS STEP | P4A PREFORMS | WOVEN FABRIC PREFORMS (PRIOR ART) | DIFFERENCES | COST NR | R | L |
|---|---|---|---|---|---|---|
| RAW MATERIALS | | | | | | |
| REINFORCEMENT | GRAPHITE TOW | GRAPHITE FABRIC | TOW IS LOWEST COST FORM OF THIS REINFORCEMENT | | . | |
| PREPARE LAY-UP MATERIALS | | | | | | |
| TACKIFY | N/A – PART OF AUTOMATED LAY-UP | APPLIED TO FABRIC @ WHEN IN ROLL FORM | APPLICABLE ONLY TO WOVEN FABRIC | | | . |
| CUT PLIES | N/A | PERFORMED BY PROGRAMMABLE CUTTING MACHINE | APPLICABLE ONLY TO WOVEN FABRIC-SIGNIFICANT LABOR & WASTE MATERIAL | | | . |
| KIT PLIES | | PERFORMED @ PROGRAMMABLE CUTTING MACHINE | APPLICABLE ONLY TO WOVEN FABRIC-SIGNIFICANT LABOR & WASTE MATERIAL | | | . |
| LOAD EQUIPMENT | GRAPHITE TOW & TACKIFIER (P4A LAY-UP) | GRAPHITE FABRIC & TACKIFIER (TACKIFY), FABRIC (PLY CUTTING) | SIMILAR | | | |
| TOOLING | | | | | | |
| LAY-UP FORMS | PERFORATED | SIMPLE CONTOUR FORMS | P4A TOOLS MORE COMPLEX & DIFFICULT TO CLEAN | + | | |
| CONTAINMENT TOOLS | PERFORATED FOR PREFORM CONSOLIDATION | N/A | ONLY P4A | + | | |
| LAY-UP AIDS | N/A | PLY LOCATION TOOLS | ONLY HAND LAY-UP | . | | |

*FIG. 8A*

| PROCESS STEP | P4A PREFORMS | WOVEN FABRIC PREFORMS (PRIOR ART) | DIFFERENCES | COST NR | COST R | COST L |
|---|---|---|---|---|---|---|
| TOOLING BAGGING TOOLS | | CAULS & REUSABLE VACUUM BAGS | ONLY WOVEN FABRIC | - | | |
| BAGGING MATERIALS | | CONSUMABLE VACUUM BAG MATERIALS | ONLY WOVEN FABRIC-ADD MATERIAL COST | | - | |
| PREPARE TOOLING CLEANING | LAY-UP & CONSOLIDATION TOOLS | LAY-UP & REUSABLE BAGGING AIDS | MORE EXTENSIVE FOR P4A TO REMOVE TACKIFIER-SPECIAL EQUIPMENT? | | | + |
| RELEASE MATERIAL | APPLY TO LAY-UP & CONSOLIDATION TOOLS | APPLY TO LAY-UP & REUSABLE BAGGING AIDS | SIMILAR | | | . |
| PREFORM LAY-UP MATERIAL LAY-UP | AUTOMATED PROCESS | HAND LAY-UP PROCESS | P4A MORE REPEATABLE, WOVEN FABRIC SIGNIFICANTLY MORE LABOR | | | . |
| PREFORM CONSOLIDATION | MULTI-STEP IN NESTED TOOLING | MULTI-STEP WITH VACUUM BAGS | P4A USES HARD TOOLING- MORE REPEATABLE-LESS LABOR | | | . |
| PREFORM TRIM | | | SIMILAR | | | . |
| PREFORM ASSEMBLY IN CURE MOLD | LOWER NUMBER OF LARGER PREFORMS | PREFORM SIZE LIMITED BY FABRIC DRAPABILITY | P4A SAVES LABOR WITH LOWER NUMBER OF PERFORMS | | | . |
| SUMMARY | P4A IS AN AUTOMATED REPEATABLE PROCESS WHICH USES LOWEST COST MATERIAL FORM WITH LESS MATERIAL SCRAP | | | + | | |

*FIG. 8A (CONT.)*

COMPOSITE TRANSMISSION HOUSING WITH DISCONTINUOUS FIBER PREFORMS

BACKGROUND OF THE INVENTION

The present invention relates to a transmission housing for a main rotor assembly, and more particularly to a composite transmission housing which utilizes a resin transfer molding (RTM) or vacuum assisted resin transfer molding (VARTM) manufacturing process combined with discontinuous fiber preforms and a method for facilitating the manufacture thereof.

The main rotor assembly of a helicopter develops large magnitude dynamic and static longitudinal, lateral, vertical, and torsional loads. Known helicopter design methodology utilizes a support structure to integrate elements of the main rotor assembly such as the rotor mast and the engine transmission with the helicopter airframe.

Typically, the transmission housing is manufactured of high strength metallic materials such as magnesium or aluminum. Although offering significant structural integrity, metallic transmission housings are relatively heavy in weight compared to composite components and have lower long-term corrosion resistance which decreases life cycle.

More recently, composite transmission housings are being manufactured of fiber reinforced resin matrix composite materials due to their advantageous strength to weight ratio. Despite the inherent weight and strength advantages, widespread use thereof has been impeded by the high cost of materials and associated fabrication methods. Composite transmission housings are relatively complicated to fabricate as the housings typically have thick and thin wall thickness sections, require high stiffness, are large in size, and must be lightweight while requiring process repeatability superior to conventional hand lay-up composite fabrication techniques. As a result, composite transmission housings may be too expensive to produce in significant volume.

Accordingly, it is desirable to provide a composite transmission housing which is lightweight, inexpensive, relatively uncomplicated to fabricate while facilitating process repeatability superior to conventional hand lay-up composite fabrication techniques.

SUMMARY OF THE INVENTION

The composite transmission housing according to the present invention includes a multiple of discontinuous fiber preforms. Structures, such as transmission housings, are designed primarily for stiffness. Such structures are ideal candidates for using discontinuous fiber preforms because the stiffness loss (i.e. reduction in material modulus) is minimal with discontinuous versus continuous fiber properties.

The preforms are assembled in a prepared injection and cure mold with additional details. Continuous fiber filler materials such as unitapes, fabrics, braid, warp knit, in dry or prepreg form are also assembled into the mold. The preforms are constructed to be assembled into the mold in a specific order and in the proper orientations.

Once the preforms are assembled into the mold, vacuum seals are installed, the mold is closed, vacuum checked, and heated to resin infusion temperature. Using a combination of vacuum and pressure, a resin is injected into the mold to completely infuse the assembled preforms. Liquid molding such as resin transfer molding [RTM] or vacuum assisted resin transfer molding [VARTM] is utilized to infuse the assembled preforms within the mold.

At completion, the mold is heated to the resin cure temperature and held at this temperature for sufficient time to insure complete cure. The mold is cooled to a point that the composite component is removed from the mold. The composite component is inspected then a number of machining and finishing operations are performed. Sub-assembly operations are then performed to complete the composite component.

The present invention therefore provides a composite transmission housing which is lightweight, inexpensive, relatively uncomplicated to fabricate, while facilitating process repeatability superior to conventional hand lay-up composite fabrication techniques.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 8A is a comparison of a discontinuous fiber preform process with a conventional prior art woven fabric preform process;

DETAILED DESCRIPTION OF THE PREFERRED EMBODIMENT

Figure 1:
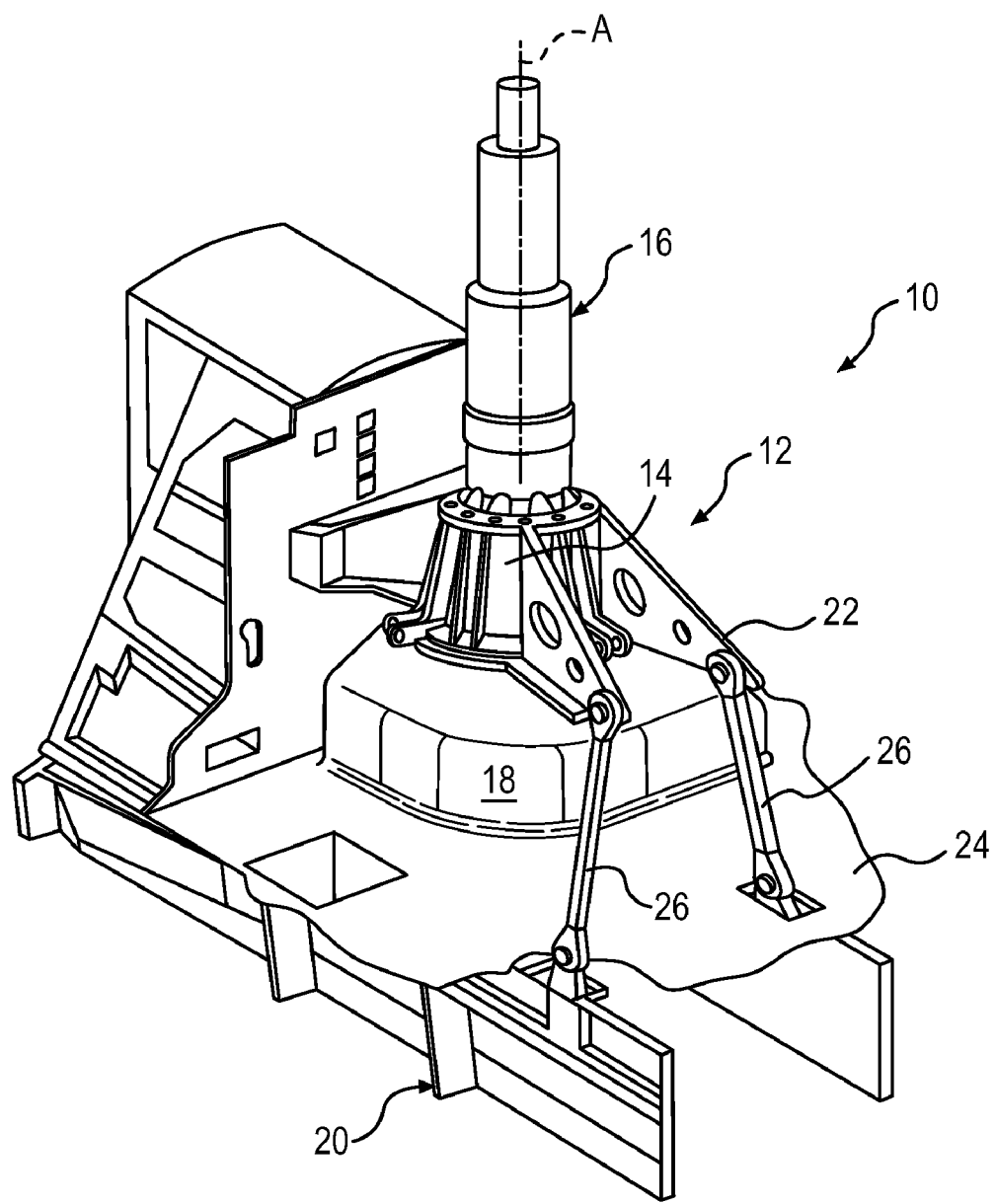
FIG. 1 is a general perspective view of a rotary wing aircraft and support structure for use with the present invention.

FIG. 1 illustrates a general perspective view of a main rotor support structure assembly 10 according to the present invention. The main rotor support structure assembly 10 includes a support housing 12 having a substantially cylindrical body member 14 which defines a main axis A about which a main rotor assembly (not shown) rotates. The support housing 12 is preferably manufactured from composite and/or other materials.

The main rotor support structure assembly 10 structurally supports elements of a helicopter main rotor head assembly 15 (FIG. 2) including a rotor standpipe 16 and rotor transmission housing assembly 18 with the airframe (illustrated schematically at 20.) At least one support strut 22 (two illustrated) extends from the substantially cylindrical body member 14 for securing the main rotor support structure assembly 10 to a transmission deck 24 mounted to the airframe 20. It should be understood that various other configurations will likewise benefit from the present invention.

Figure 3:
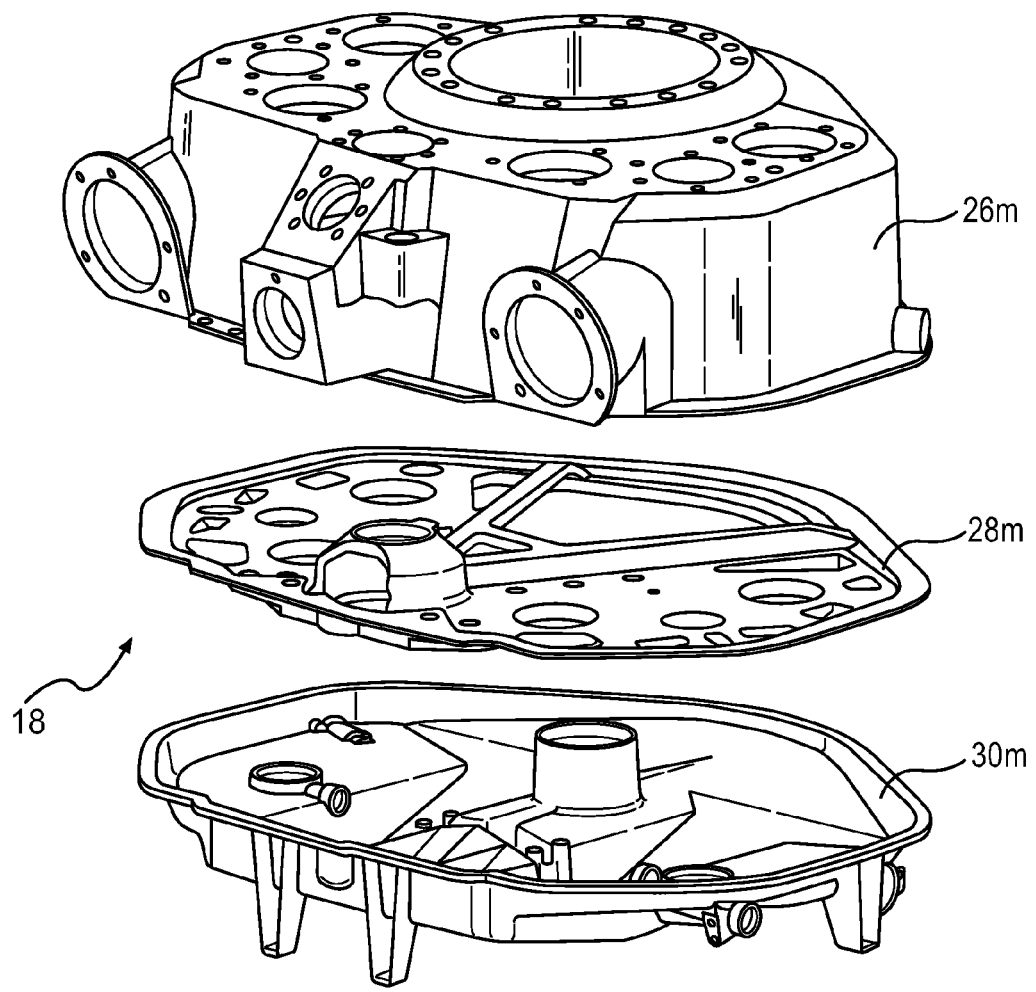
FIG. 3 is an exploded perspective view of a composite transmission housing assembly.

Referring to FIG. 3, the rotor transmission housing assembly 18 includes a machined upper transmission housing 26$m$, a machined lower transmission housing 28$m$ and a machined sump housing 30$m$. That is, the housing portions 26$m$, 28$m$, and 30$m$ are illustrated after machining operations and in an installable state. It should be understood that relative positional terms such as "forward," "aft," "upper," "lower," "above," "below," and the like are with reference to the normal operational attitude of the vehicle and should not be considered otherwise limiting. It should also be understood that although a particular component arrangement is disclosed in the illustrated embodiment, other arrangements will benefit from the instant invention.

Figure 4A:
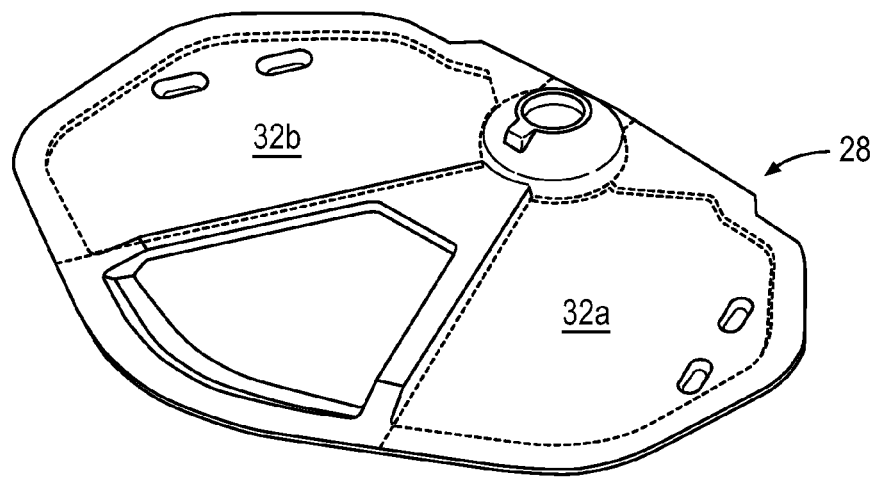
FIG. 4A is a top perspective view of a lower composite transmission housing.
Figure 4B:
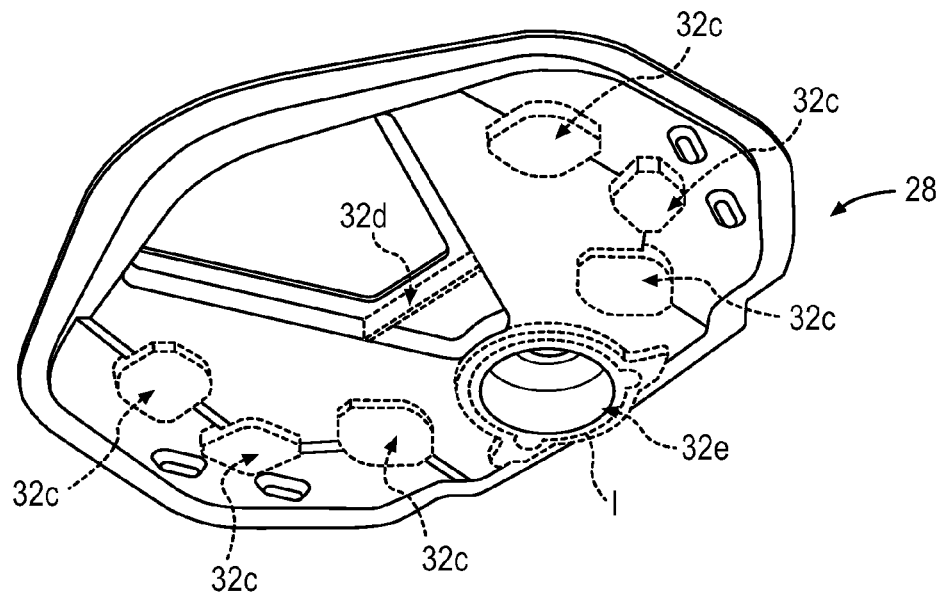
FIG. 4B is a bottom perspective view of a lower composite transmission housing.

Referring to FIGS. 4A and 4B, the machined lower transmission housing 28$m$ (as illustrated in FIG. 3) is illustrated prior to machining as a lower transmission housing 28 as molded. The lower transmission housing includes a multiple of discontinuous fiber preforms 32$a$-32$e$ such as a LH main body preform 32$a$, RH main body preform 32$b$, bearing build up preforms 32$c$, rib preform 32$d$ and beehive base preform 32$e$. It should be understood that any number and configuration of preform portions will benefit from the present invention.

The discontinuous fiber preforms are preferably fabricated by a Programmable Powder Preform Process for Aerospace (P4A) process such as that developed by National Composites Center, Dayton Ohio. The process is capable of fabricating both random and oriented discontinuous fiber preforms from both glass and carbon (graphite) continuous fiber raw material. It is also potentially capable of handling very high modulus pitch based carbon fiber, which may often not be practical in a woven form.

Figure 5:
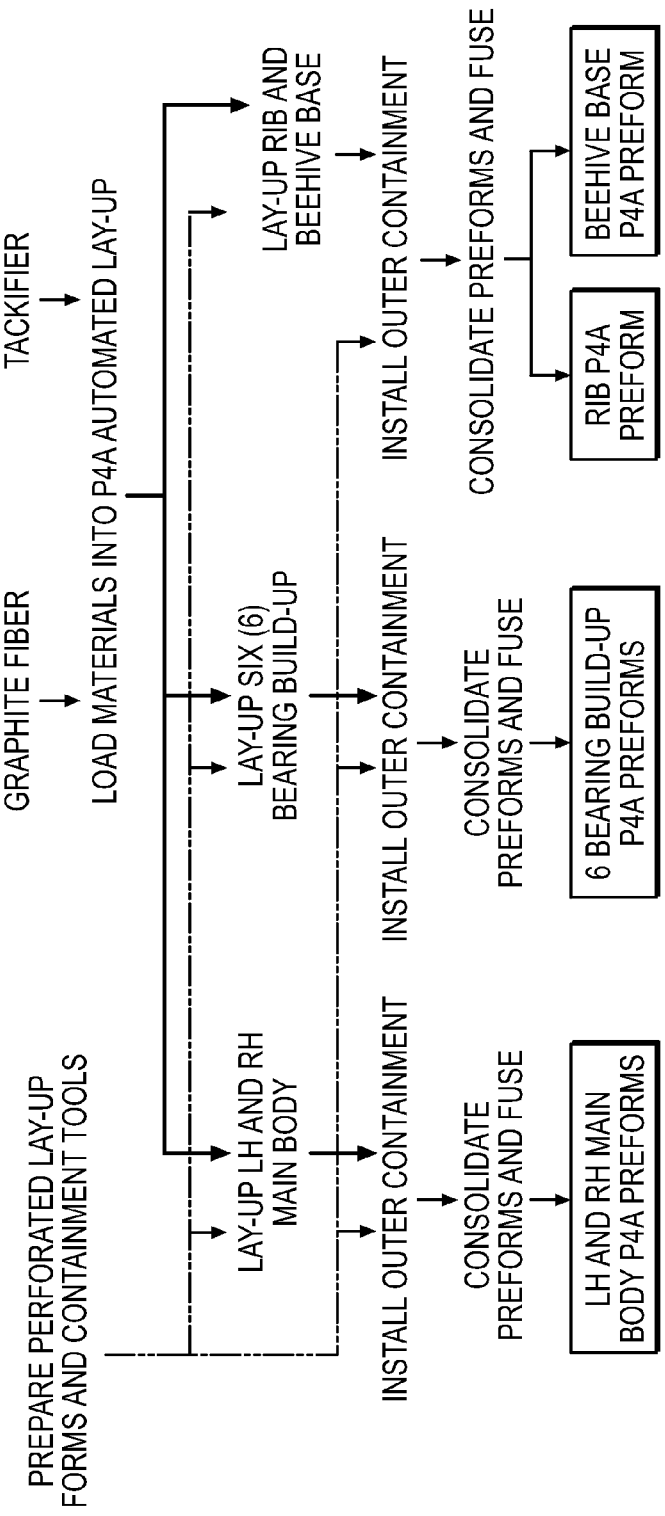
FIG. 5 is a process flow diagram for lower housing P4A preforms.

Referring to FIG. 5, a method for fabricating the preforms is illustrated in a process flow diagram. The preforms 32$a$-32$e$ are each laid-up using contoured porous tooling attached to a vacuum system. The fibrous material is applied through a chopper head, which is attached to a programmable robot arm. Powered resin (tackifier) is also applied, in a programmed manner simultaneously with the chopped fiber. Vacuum holds the chopped fiber in place after deposition on the porous tooling. During this lay-up period other materials such as inserts, veil cloth, or woven fabric may be added to the preform as required.

After deposition of a programmed thickness of material, or the complete amount for a specific preform, a second porous tool is placed over the lay-up sandwiching it between the two porous tools. With vacuum the two tools are positioned so that the preform lay-up is consolidated to a controlled thickness. The consolidated preform, supported by the porous tools, is heated in an oven or with hot air to a temperature to fuse the powdered resin. After cooling, the preforms 32$a$-32$e$, which now are sufficient rigid for handling, is removed from the tooling.

Structures such as transmission housings are designed primarily for stiffness. Such structures are ideal candidates for using discontinuous fiber preforms such as the P4A preforms, because the stiffness loss (i.e. reduction in material modulus) is minimal with discontinuous versus continuous fiber properties. Also, fibrous materials not suited to weaving are readily applicable to the discontinuous form. The present invention thereby provides a new level of optimization of structural properties for stiffness.

Figure 6:
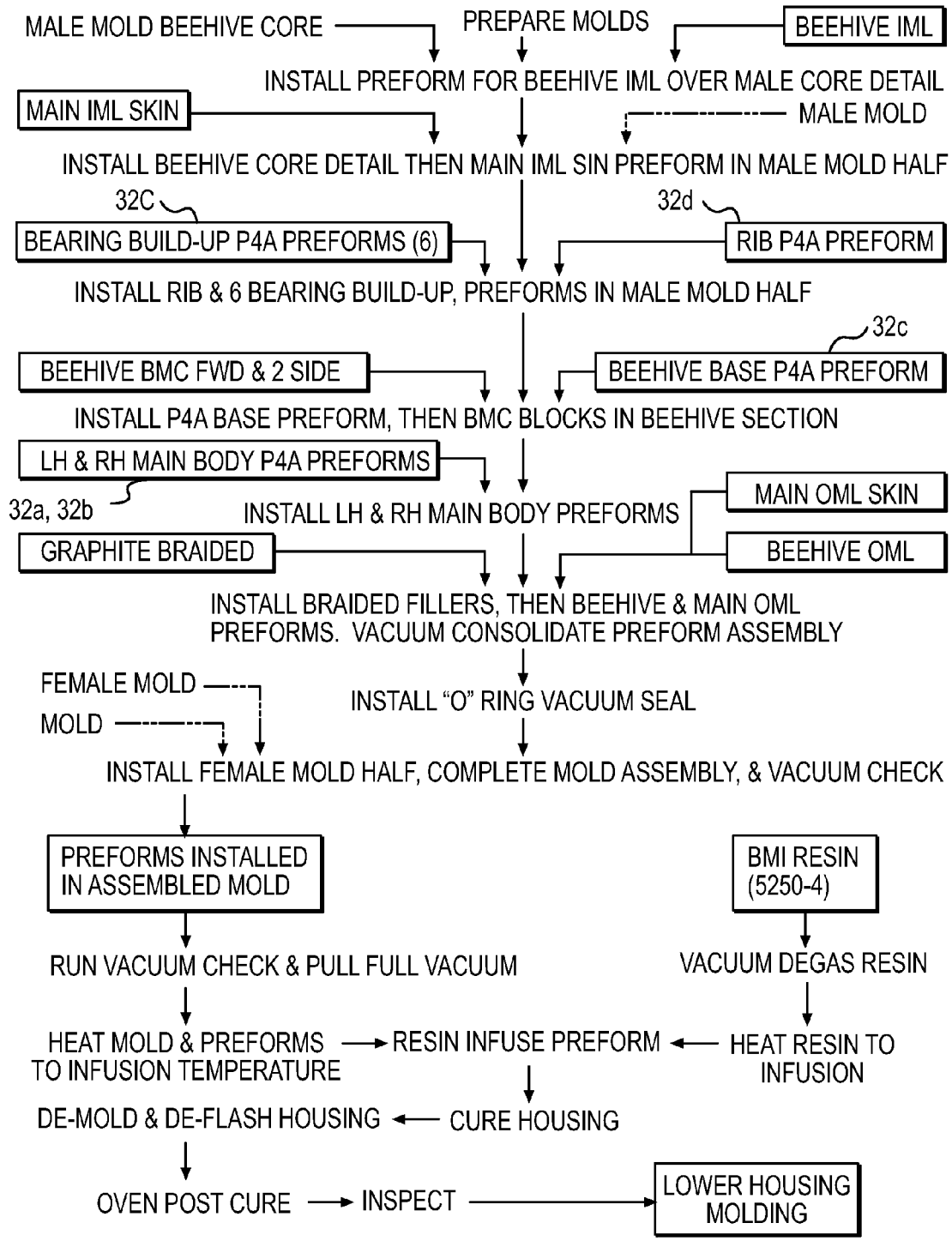
FIG. 6 is a process flow diagram for a composite molding lower housing.
Figure 7:
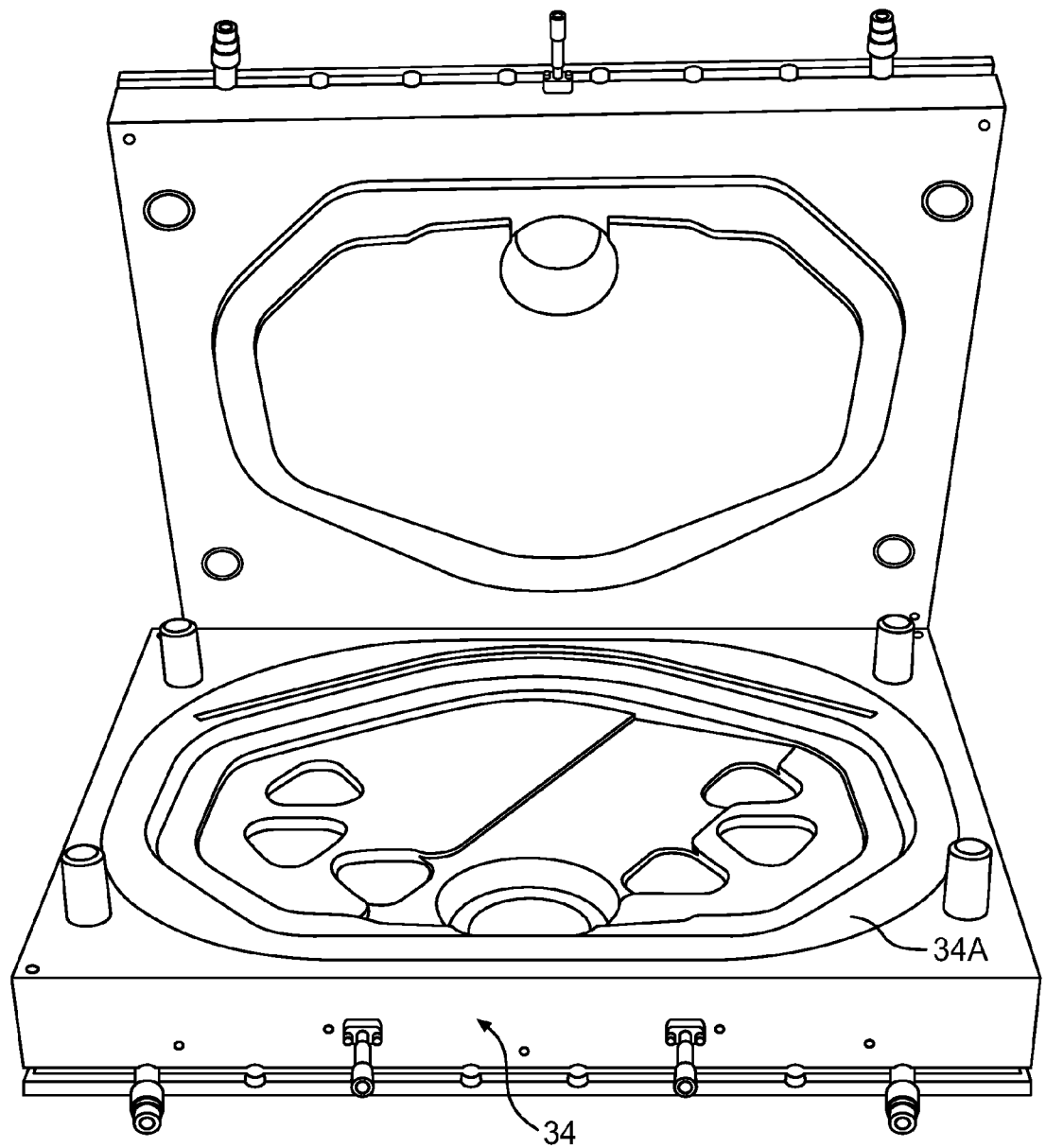
FIG. 7 is a perspective view of a cure and injection mold for a composite transmission housing according to the present invention.

Referring to FIG. 6, a method for fabricating the lower transmission housing 28 is illustrated in a process flow diagram. Generally, the preforms 32$a$-32$e$ are assembled in a prepared injection and cure mold 34 (FIG. 7). Additional details and fillers (one such detail I in one preform illustrated schematically in FIG. 5) such as metal inserts, supports, reinforcements and the like are also added to the preform assembly and/or within the mold 34. Continuous fiber filler materials (illustrated schematically at F in FIG. 4B) such as unitapes, fabrics, braid, warp knit, in dry or prepreg form are also assembled into the mold 34. Preferably, the continuous fiber filler materials provide a further interface between two or more preforms 32$a$-32$e$ which, in contrast, are formed of randomly-oriented fibers.

The preforms 32$a$-32$e$ are preferably assembled upon a male portion 34A (FIG. 7) of the mold 34. Most preferably, the preforms 32$a$-32$e$ are constructed such that the preforms 32$a$-32$e$ can only be assembled into the mold 34 in a specific order and in the proper arrangement. That is, the preforms 32$a$-32$e$ are interleaved to fit together in a manner of jig-saw puzzle pieces to prevent improper assembly.

Once the preforms 32$a$-32$e$ are assembled into the mold 34, vacuum seals are installed, the mold 34 is closed, vacuum checked, and heated to resin infusion temperature. Using a combination of vacuum and pressure, a resin is injected into the mold to completely infuse the preform. That is, liquid molding such as resin transfer molding [RTM] or vacuum assisted resin transfer molding [VARTM] is utilized to infuse the assembled preforms 32$a$-32$e$ within the mold 34.

Epoxies, Bismaleimides, and Cyanate Esters are preferably used with P4A fiberglass and graphite preforms 32$a$-32$e$ for high performance applications using conventional resin transfer molding (RTM) processes.

At completion the mold 34 is heated to the resin cure temperature and held at this temperature for sufficient time to insure complete part cure. The part and the mold are cooled to a point that the part can be removed from the mold.

The part is inspected then a number of machining and finishing operations are performed. Next a number of sub-assembly operations are performed to complete the composite transmission housing 28 (FIG. 2).

Figure 8B:
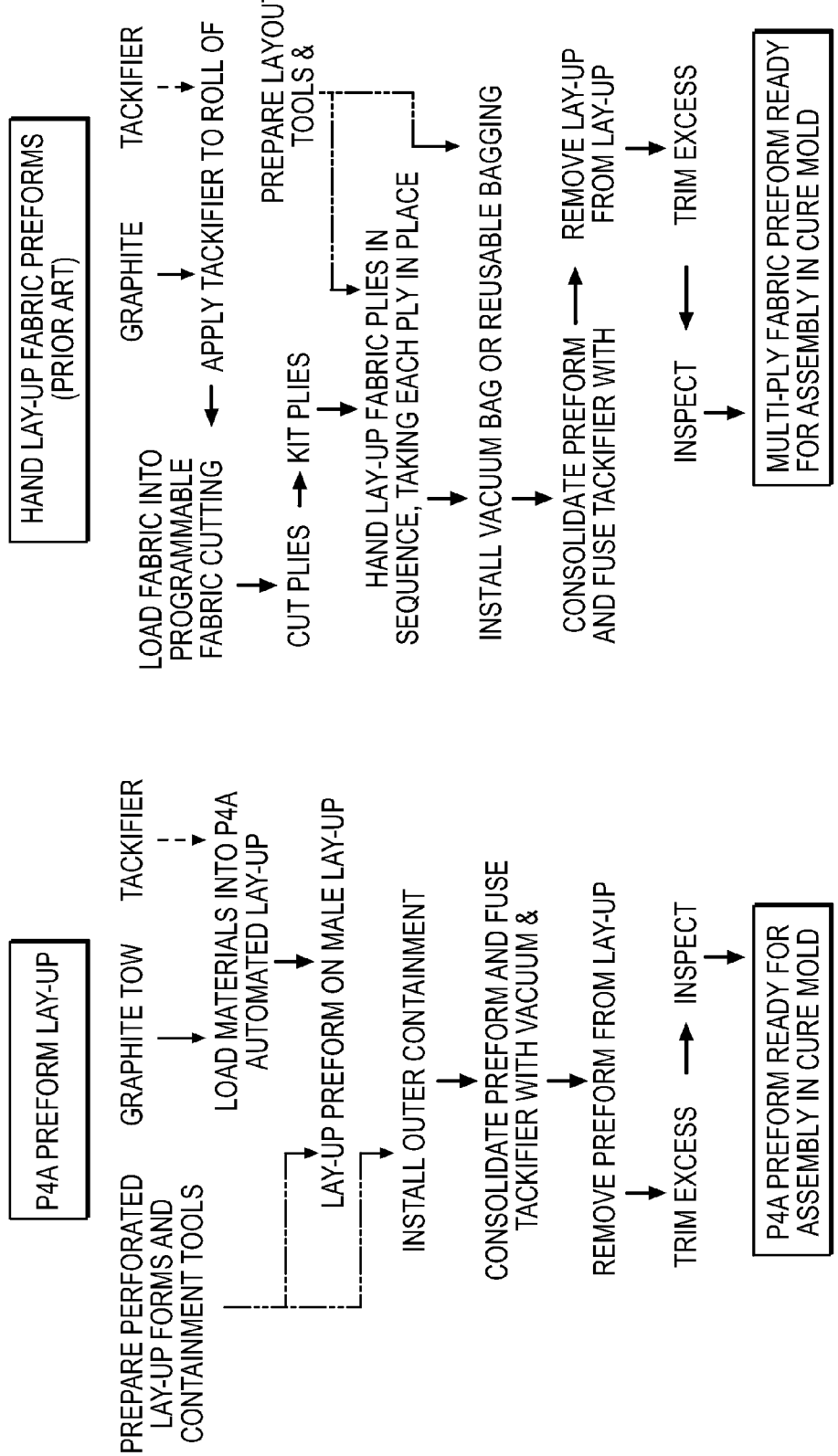
FIG. 8B is an automated P4A process flow diagram as compared to a conventional prior art fabric hand lay-up process.

Referring to FIG. 8, the present invention provides a fabrication approach that significantly reduces the fabrication costs for structures fabricated using RTM/VARTM processing as-compared to conventional hand lay-up methods of preform fabrication. FIG. 8 shows both labor & material savings (lower raw material cost of tow versus fabric & less than half as much scrap from trimming, cutting, etc).

Figure 2:
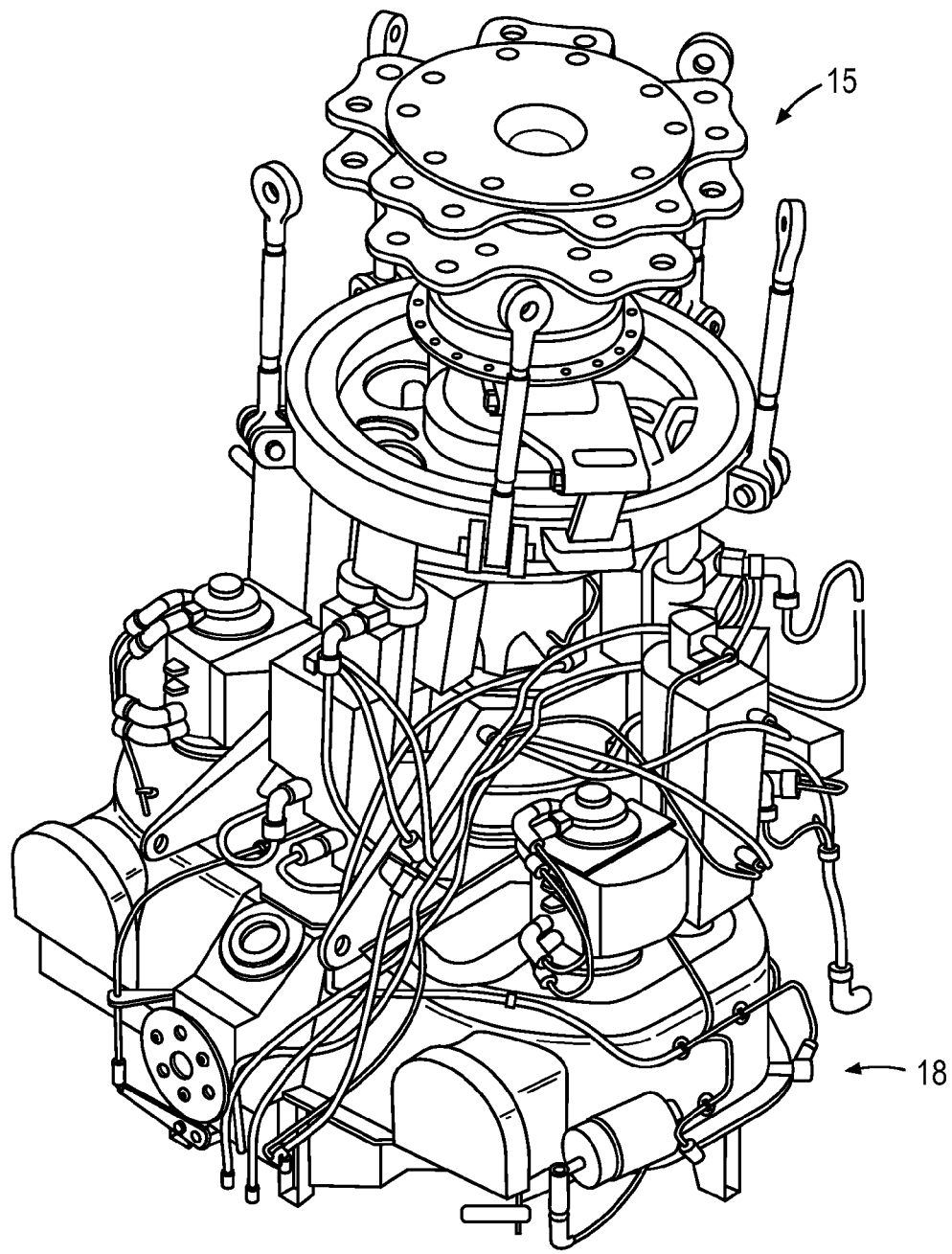
FIG. 2 is an expanded view of a rotary wing rotor assembly.
Figure 9A:
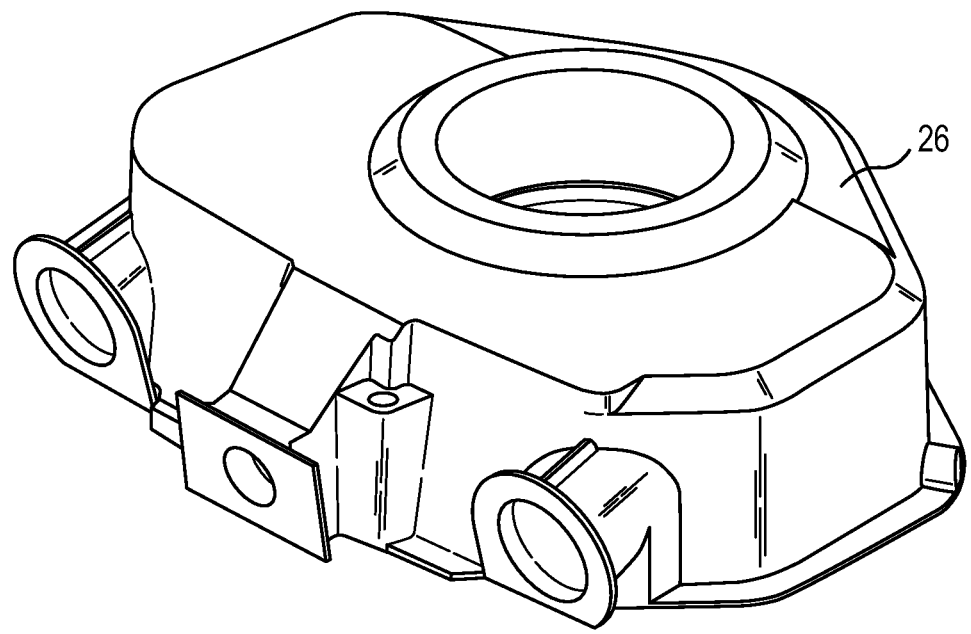
FIG. 9A is a top perspective view of an upper composite transmission housing.
Figure 9B:
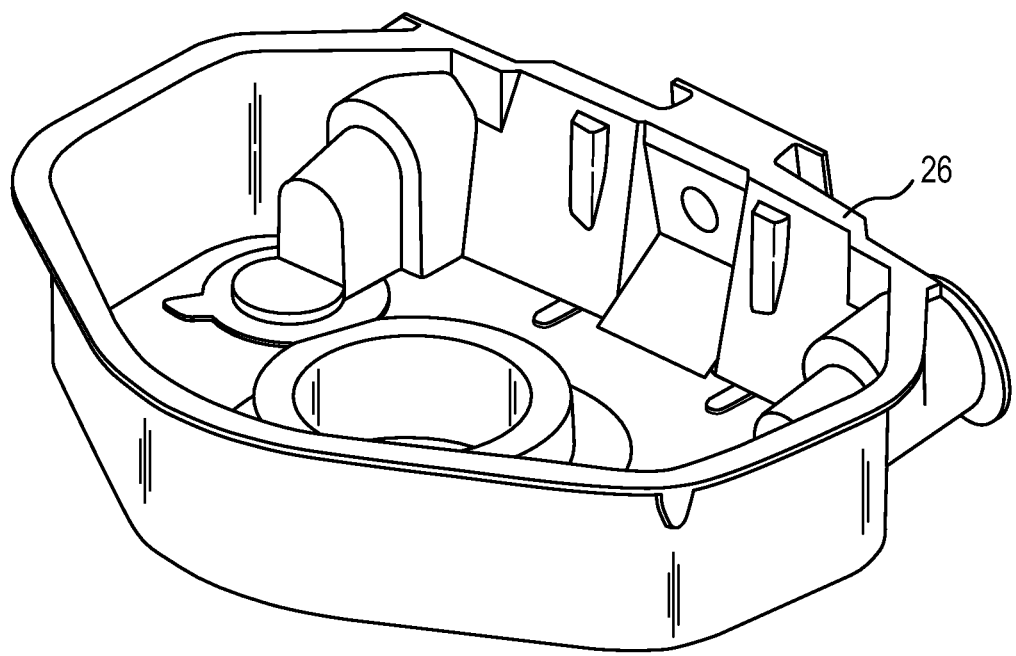
FIG. 9B is a bottom perspective view of a composite upper transmission housing.
Figure 10:
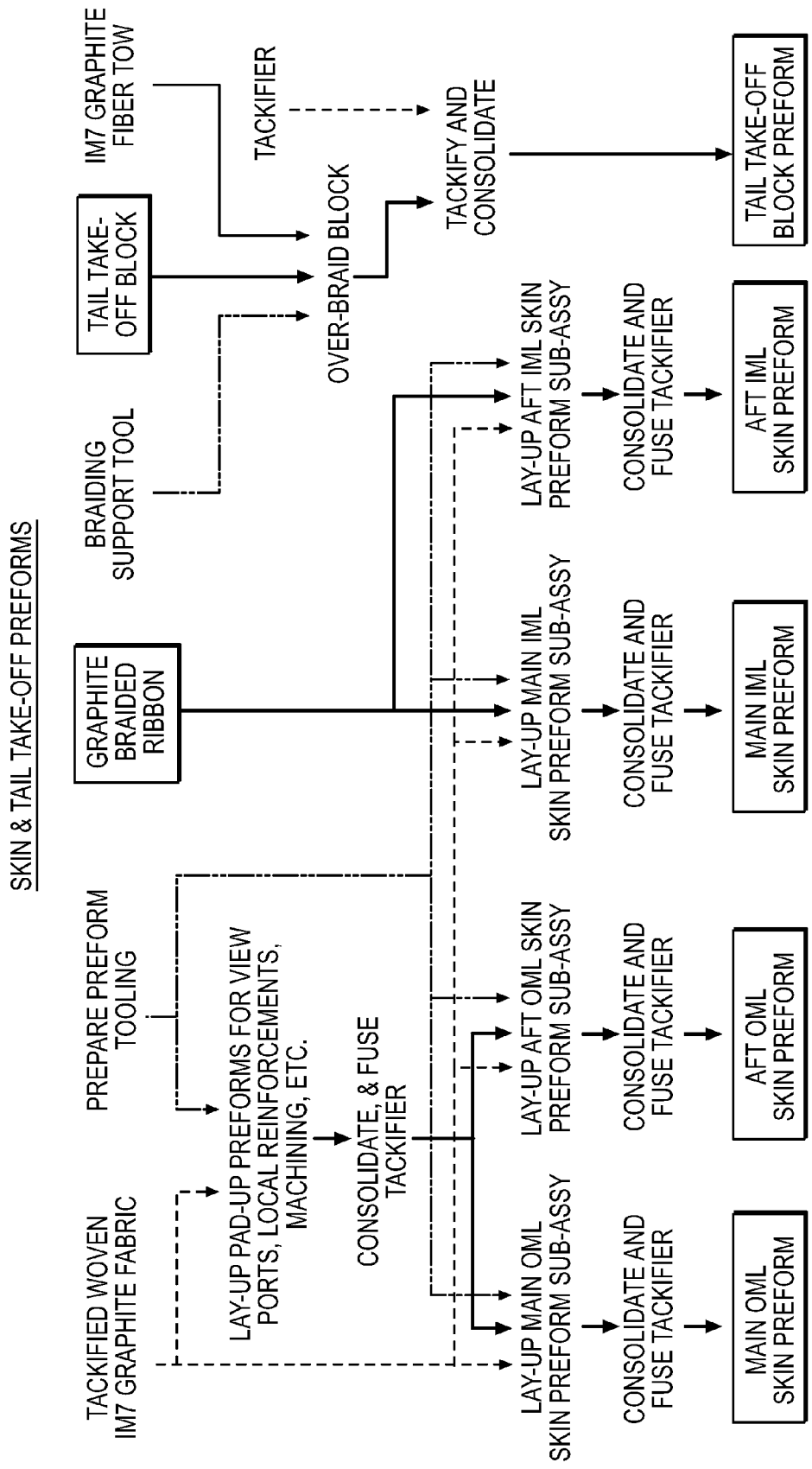
FIG. 10 is a process flow diagram for a skin and tail take-off preforms for an upper composite transmission housing.
Figure 11:
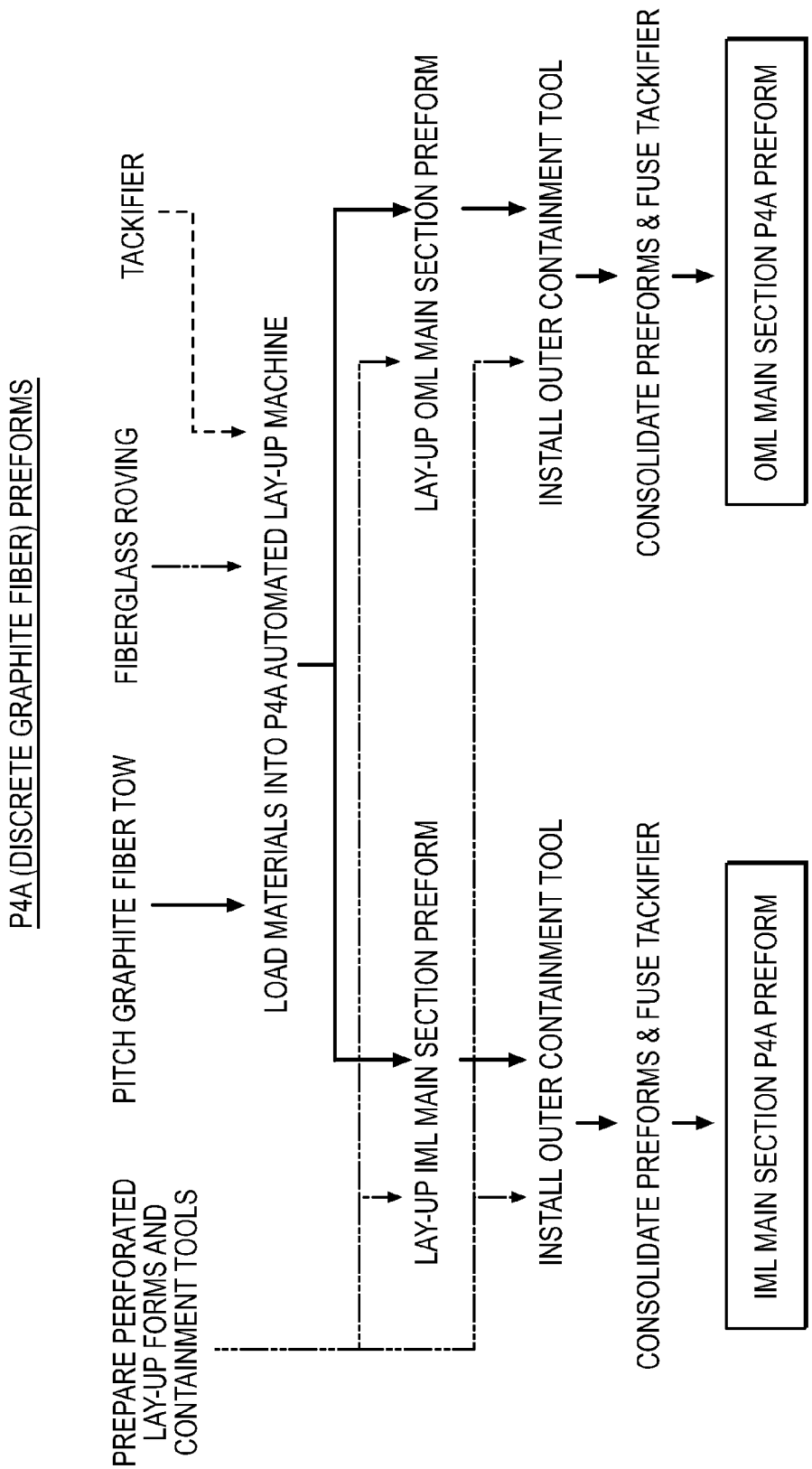
FIG. 11 is a P4A preform process flow diagram.
Figure 12:
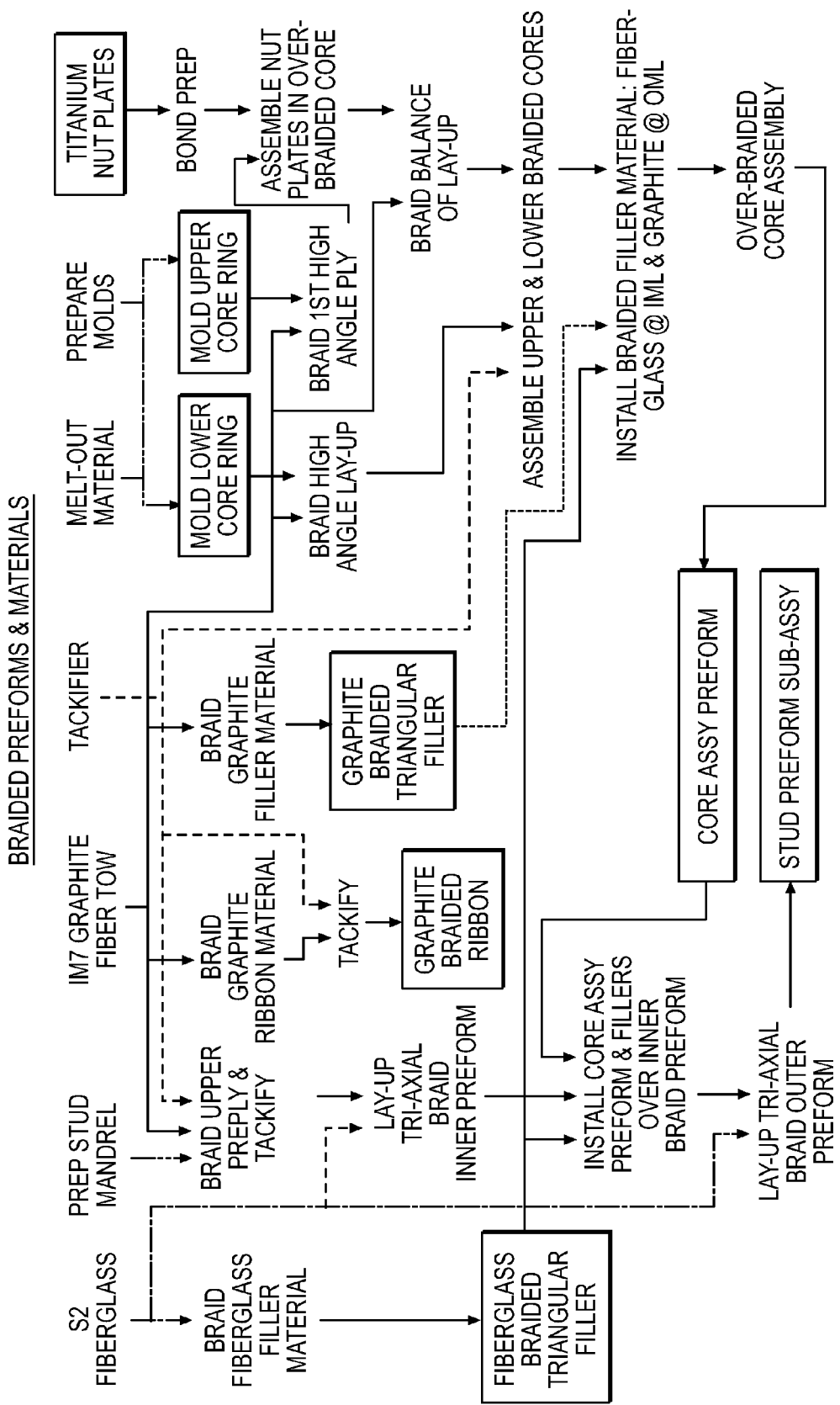
FIG. 12 is a braided preform process flow diagram.
Figure 13:
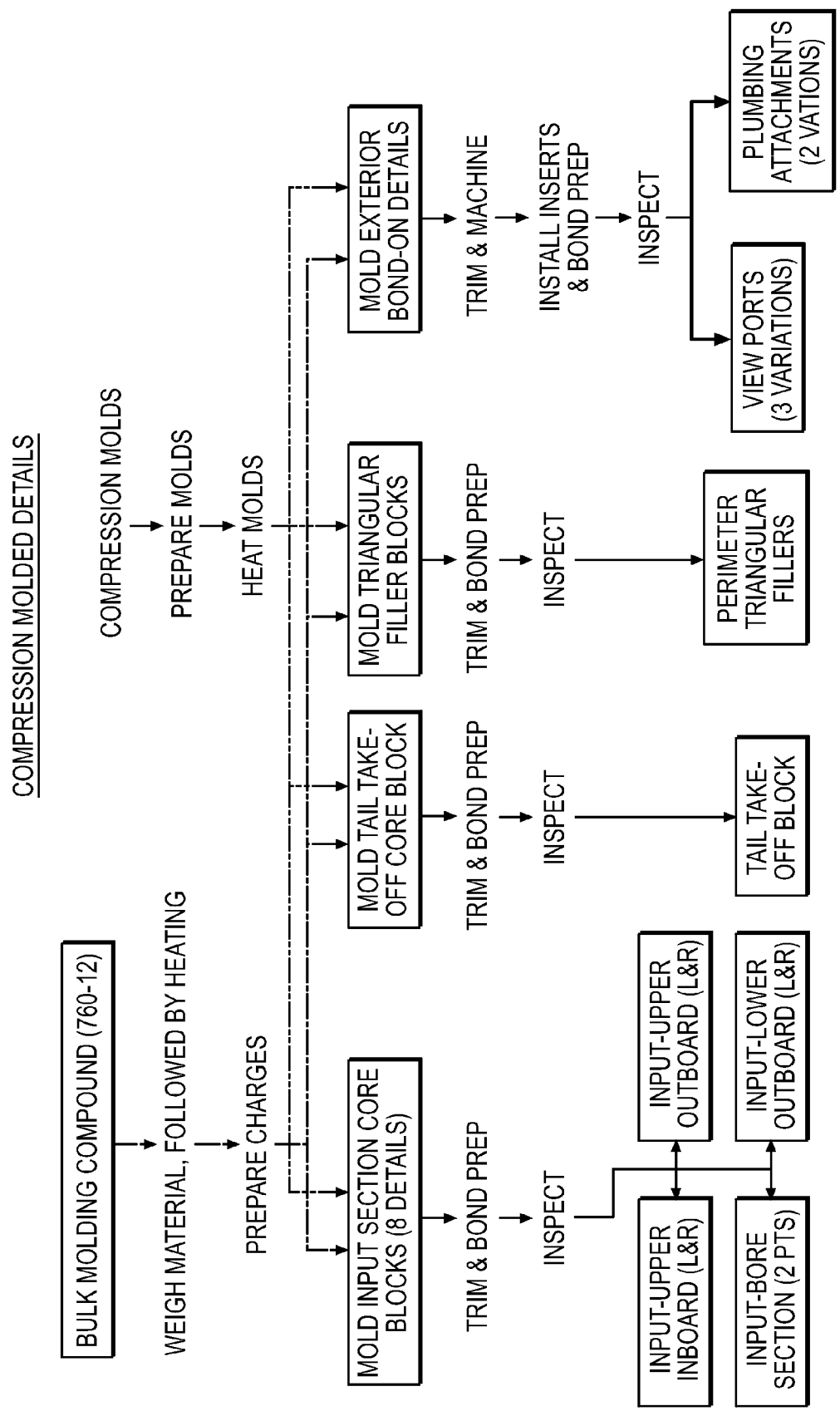
FIG. 13 is a process flow diagram for a compression molded details for a P4A preform.
Figure 14:
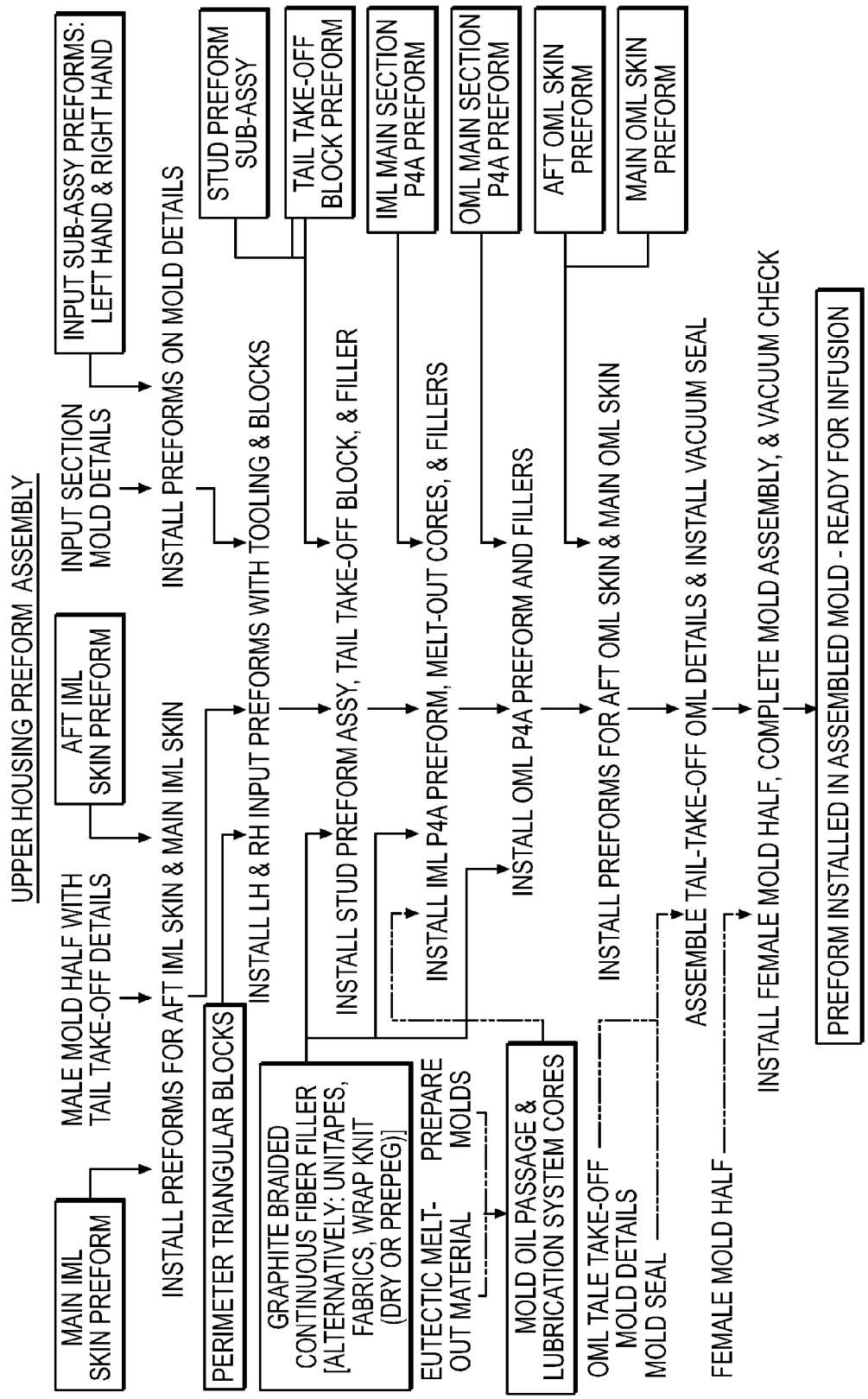
FIG. 14 is a process flow diagram for a composite upper housing preform assembly within a cure and injection mold.
Figure 15:
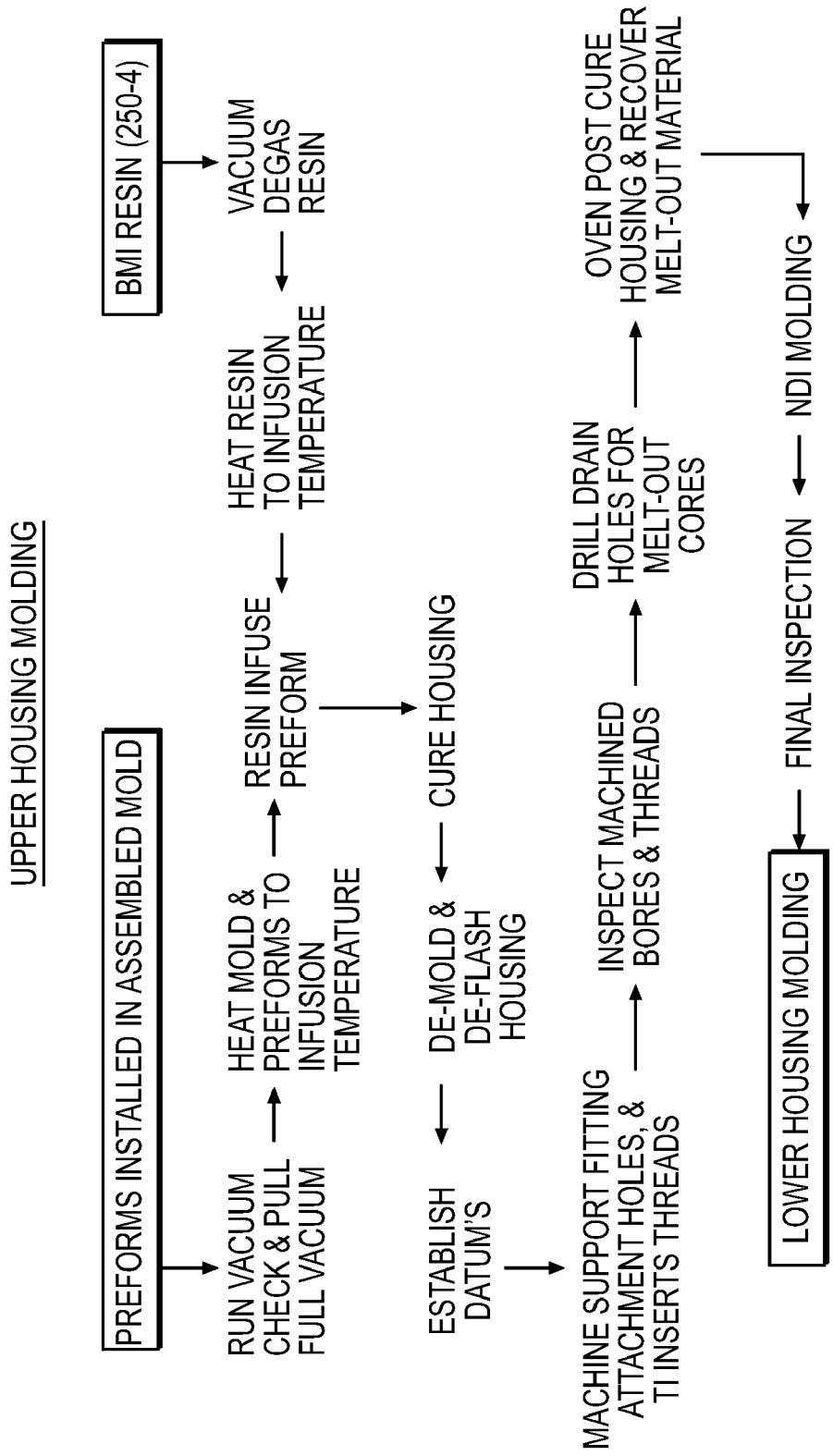
FIG. 15 is a process flow diagram for a composite upper transmission housing.

Referring to FIGS. 9A and 9B the machined upper transmission housing 26$m$ (as illustrated in FIG. 2) is illustrated prior to machining as an upper transmission housing 26 as molded. The upper transmission housing 26 is manufactured as described with the lower transmission housing 28 through assembly of a multiple of discontinuous fiber preforms (as illustrated by the process flow diagrams in FIGS. 10-15). Although of a more complicated geometry which necessitates additional preforms (FIGS. 10-12) which utilize compression details themselves (FIG. 13), the upper transmission housing 26 likewise generally follows the method of: fabricating a multiple of discontinuous fiber preforms; assembling the multiple of discontinuous fiber preforms within an injection and cure mold; and resin injecting the multiple of discontinuous fiber preforms to form the final component.

The present invention utilizing the P4A preforms alone or in combination with other continuous fiber forms is particularly suited to structure, such as the disclosed composite transmission housing, that incorporates both thick and thin laminate sections with abrupt thickness transitions. The P4A process, as proposed for the disclosed transmission housing RTM preforms, is particularly suited to incorporating cured composite or metal inserts as integral parts of these preforms and hence the related structure after resin infusion and cure to provide localized strength.

The present invention may be used in the fabrication of components with similar requirements such as components which typically have thick and thin wall thickness sections, require high stiffness, large size, lightweight when compared to non composite structure, process repeatability superior to conventional hand lay-up composite processes, and quality and structural integrity typical of aerospace components.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A composite airframe structure comprising:
a resin transfer molded composite transmission housing formed of a multiple of discontinuous fiber preforms, each of said multiple of discontinuous fiber preforms formed of randomly-oriented fibers, said resin transfer molded composite transmission housing having at least two adjacent discontinuous fiber preforms with a continuous fiber filler material which interfaces with said at least two adjacent discontinuous fiber preforms, said continuous fiber filler material formed of an oriented fiber material.

2. The structure as recited in claim 1, wherein said transmission housing comprises an upper transmission housing and a lower transmission housing.

3. The structure as recited in claim 1, wherein at least one of said discontinuous fiber preforms comprise a beehive preform.

4. The structure as recited in claim 1, wherein at least one of said discontinuous fiber preforms comprise a rib preform.

5. The structure as recited in claim 1, wherein at least one of said discontinuous fiber preforms comprise a bearing build-up preform.

6. The structure as recited in claim 1, wherein said continuous fiber filler material is between said at least two adjacent discontinuous fiber preforms.

7. The structure as recited in claim 1, wherein said discontinuous fiber preforms comprise over 65 percent of said resin transfer molded composite transmission housing by weight.

8. The structure as recited in claim 1, further comprising an insert which forms an integral part of at least one of said multiple of discontinuous fiber preforms.

9. The structure as recited in claim 1, wherein said at least two adjacent discontinuous fiber preforms are interleaved.

10. The structure as recited in claim 1, wherein at least one of said multiple of discontinuous fiber preforms are formed by a Programmable Powder Preform Process for Aerospace (P4A) process.

11. A main rotor transmission housing assembly for a rotary-wing aircraft comprising:
an upper transmission housing formed of a multiple of discontinuous fiber preforms having at least two adjacent discontinuous fiber preforms each of said multiple of discontinuous fiber preforms formed of randomly-oriented fibers, said upper transmission housing having at least two adjacent discontinuous fiber preforms with a continuous fiber filler material which interfaces with said at least two adjacent discontinuous fiber preforms, said continuous fiber filler material formed of an oriented fiber material; and
a lower transmission housing formed of said chopped fiber having a multiple of discontinuous fiber preforms having at least two adjacent discontinuous fiber preforms, each of said multiple of discontinuous fiber preforms formed of randomly-oriented fibers, said lower transmission housing having at least two adjacent discontinuous fiber preforms with a continuous fiber filler material which interfaces with said at least two adjacent discontinuous fiber preforms, said continuous fiber filler material formed of an oriented fiber material, said lower transmission housing matable with said upper transmission housing.

12. The assembly as recited in claim 11, further comprising a sump housing mateable with said lower transmission housing, said sump housing formed of a multiple of discontinuous fiber preforms having at least two adjacent discontinuous fiber preforms each of said multiple of discontinuous fiber preforms formed of randomly-oriented fibers, said sump housing having at least two adjacent discontinuous fiber preforms with a continuous fiber filler material which interfaces with said at least two adjacent discontinuous fiber preforms, said continuous fiber filler material formed of an oriented fiber material.

13. A composite airframe structure comprising:
a resin transfer molded composite transmission housing formed of a multiple of discontinuous fiber performs, each of said multiple of discontinuous fiber preforms formed of randomly-oriented fibers, said resin transfer molded composite transmission housing having at least two discontinuous fiber preforms with a continuous fiber filler material which interfaces with said at least two discontinuous fiber preforms, said continuous fiber filler material formed of an oriented fiber material, said multiple of discontinuous fiber performs forming over 65 percent of said resin transfer molded composite transmission housing by weight.

* * * * *